Oct. 9, 1962 H. HURVITZ 3,058,005
TELEMETER SYSTEM
Filed Jan. 17, 1958

INVENTOR
HYMAN HURVITZ

United States Patent Office
3,058,005
Patented Oct. 9, 1962

3,058,005

TELEMETER SYSTEM

Hyman Hurvitz, 1313 Juniper St. NW., Washington, D.C.

Filed Jan. 17, 1958, Ser. No. 709,535
8 Claims. (Cl. 250—220)

The present invention relates generally to code reading devices, and more particularly to code reading devices for reading codes recorded on a rotary disc to indicate the angular position thereof.

It is a known problem in telemetering to read the angular position of a shaft. For this purpose a coded disc is secured to the shaft and is rotatable therewith. Usually the coding of the disc is binary, and each value indicating element of the code is located on a different radius of the disc. Where extreme accuracy is required a considerable number of radii may be employed, yet the total space available for the disc in the decoding apparatus may be quite small. Where the discs are small, the radial distances between elements of the code may be extremely small, in the order of $\frac{1}{64}$ of an inch, and in such case it becomes extremely difficult to employ a different read-out device for each element. The usual read-out device employed is photoelectric in nature, and it has been the case that a light has been passed through a suitable coded disc along one radius thereof, and the coding of the disc has been detected by means of a plurality of photoelectric cells, one for each element of the code. In such cases, extremely small photoelectric cells must be employed, and furthermore a lead must be taken from each photoelectric cell. In the alternative, a plurality of light sources may be employed, one for each bit of the code, and a single photoelectric cell may be then employed. In such case, however, the lights must be turned on and off in sequence, and must be extremely small in size, i.e., they must be point sources of light. The requirement may further exist that the point sources of light be capable of extremely rapid energization and deenergization, so that no considerable time will be required to read out one set of readings from the code wheel.

In accordance with the present invention electroluminescent condensers are employed as light sources in read out devices for coded discs. These have the advantge of responding to voltage very rapidly, i.e., they can be cut on and off very rapidly by turning on and off a control voltage. They have the further advantage that they generate no heat, and require very little power. Photoelectric condensers may be made essentially as point sources with no difficulty. Separate electroluminescent light sources are then selected by connecting each electroluminescent condenser in series with a tuning coil, the tuning coils or the condensers, or both, being so designed that each resonant circuit consisting of an electroluminescent condenser and a tuning coil in series therewith is tuned to a different frequency from all the others. The frequencies may nevertheless be quite close together. The resonant circuits are then energized from a scanning oscillator, or other source of radio frequency, which scans over the resonant frequencies of the separate tuned circuits. As each resonant circuit is driven at its resonant frquency, a relatively high voltage appears across the condenser of that resonant circuit, and it glows. All the other circuits, not being driven resonantly, do not glow. Due to the scanning action of the oscillator, the condensers are caused to glow in sequence. The rate at which the condensers are caused to glow sequentially may be readily adjusted by selecting the sweep rate for the oscillator. It then becomes a simple matter to sweep quite rapidly or extremely slowly. Since the tuning coils for the separate electroluminescent condensers may be located at a considerable distance from the condensers themselves, the total read out equipment required to be located adjacent to the coded disc may be made quite small.

It is, accordingly, a board object of the present invention to provide a novel read out device for coded discs, employing point sources of light which may be located quite close together, along a common radius, and energizing the sources of light in sequence by including the point sources of light in resonant circuits of different resonant frequencies, which are selected in turn by means of a scanning oscillator.

The above and still further objects, features and advantages of the present invention will become apparent upon consideration of the following detailed description of one specific embodiment thereof, especially when taken in conjunction with the accompanying drawings, wherein.

Figures 1, 2, 3, 4:
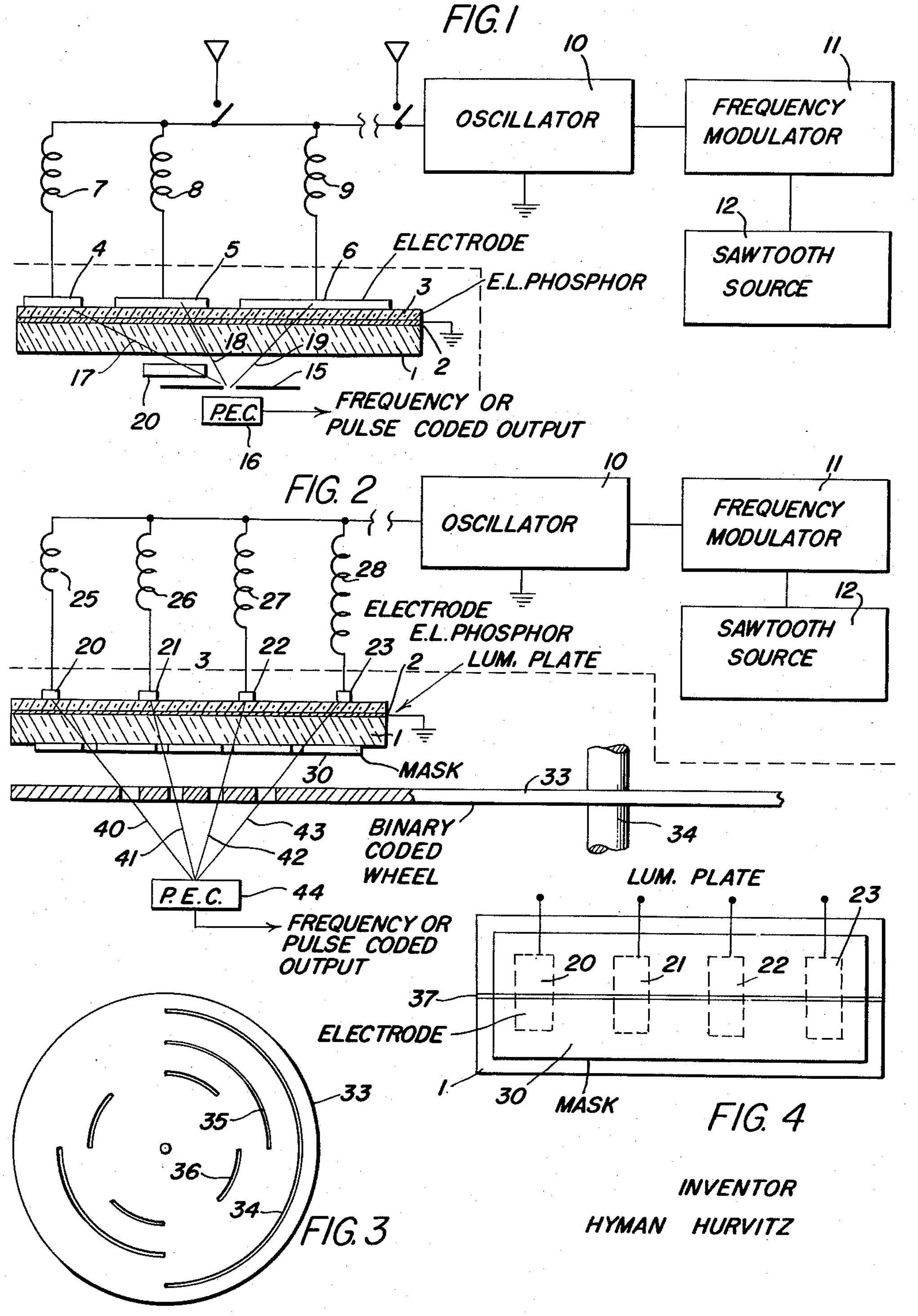
FIGURE 1 is largely a block diagram of the system according to the invention, showing electroluminescent condensers having different capacities in a read-out system.
FIGURE 2 is a modification of the system of FIGURE 1 employing essentially point source electroluminescent condensers.
FIGURE 3 is an exemplary representation of a binary coded disc of the type which is commonly employed for shaft position telemetering.
FIGURE 4 is a view in plan of a portion of FIGURE 2.

Referring now more specifically to the accompanying drawings, the reference numeral 1 denotes a sheet of transparent material such as glass having thereon a conductive coating 2 which is transparent to light. Superposed on the coating 2 is a layer of electroluminescent phosphor 3, which may, if desired, be included in a binder of ceramic material and fired onto the glass 1. A plurality of electrodes 4, 5 and 6 are in contact with the phosphor layer 3, and are of different sizes respectively. Connected in series with each of the electrodes 4, 5 and 6 is a different tuning coil, these denoted by the reference numerals 7, 8 and 9, respectively. The capacities of the condensers 4, 5 and 6 and the inductances of the coils 7, 8 and 9 are so selected that the resonant circuits formed thereby resonate at different frequencies within a relatively narrow band. The circuits are driven simultaneously from an oscillator 10, the frequency of which is caused to scan over the band of frequencies within which fall all the resonant frequencies of the tuned circuits, by means of a frequency modulator 11 driven by a sawtooth source 12, in a fashion which is, per se, conventional. As the oscillator scans over its band of frequencies, the circuits 4—7, 5—8 and 6—9 are driven resonantly in sequence, or one at a time. The phosphor bits lying under the condensers 4, 5 and 6, accordingly glow in sequence, and supply light through a collimating slot 15 to a photoelectric cell 16. The paths which the light take in arriving at the photo cell are indicated by the lines 17, 18 and 19. It may be observed that if an object such as 20 is interposed in one of the paths, such as path 17, that the output of the photoelectric cell 16 will be time coded to indicate which one of the light beams is intercepted.

In the system of FIGURE 2, the electroluminescent structure is similar to that of FIGURE 1, generally. However, the electrodes are made extremely small, and are denoted by the reference numerals 20, 21, 22 and 23. For purposes of illustration, the electrodes have been illustrated as appreciable in size, but in fact they may be represented by extremely fine wires or probes, the points of which touch the phosphor. In the alternative, large electrodes may be employed but the light output thereof may be masked. It is the latter expedient which is specifically described in the present embodiment of my invention.

Connected in series with the probe 20 is a tuning coil 25 and similarly the probes 21, 22 and 23 are associated in series with tuning coils 26, 27 and 28. These are all driven simultaneously by oscillator 10. The probes 20 to 23, inclusive, all are of the same size, in which case the coils 25—28 may be of different inductances, in order that each resonant circuit may be resonant at a different frequency. Accordingly, as the oscillator 10 scans over its band of frequencies light appears under the probes 20, 21, 22 and 23, in sequence.

Located under the plate 1 is a mask 30. This masks the light coming from the electrodes 20, 21, 22 and 23, except along a radius of a binary coded disc or wheel 33, which rotates on a shaft 34. In FIGURE 3 may be seen the coding of the wheel 33, it being binary in nature, each element of the code, as 34, 35, 36, being on a different radius of the disc. The coding may be in terms of transparent areas on an opaque background, or conversely of opaque lines on a transparent background, and either of these methods have been employed in the past. The opening in the mask 30 is represented at 37, which permits light to flow on only one radius of the disc 33. Obviously, in the alternative, small apertures may be made in the mask to permit light to pass only along desired paths, these paths being represented at 40, 41, 42 and 43, and the light eventually falling on a photoelectric cell 44, which provides a signal in accordance with whether the light does or does not fall thereon.

By commutating the light sources at a desired rate, a single photo-cell may be employed to read-out a complex binary coded disc serially.

It will be noted that the coded output of the present system is pulse coded, but also that it is frequency coded, since the luminescent material employed as light sources responds at frequencies of many mc., i.e., is amplitude modulated at the frequency of oscillator 10. In effect a frequency representation of each track 34, 35, 36 is present at the output of PEC 44 or absent, according to the angular position of the disc 33. By employing less than an octave for the total band swept by oscillator 10, harmonics generated by non-linearity of light response to signal amplitude may readily be eliminated at the output of PEC 44.

Shaft position may then be recorded remotely by means of systems such as that of my application, Serial No. 501,891, now Patent No. 2,863,711, filed April 18, 1955, entitled Recording, wherein signals transmitted by the present system are applied to terminal 5 of Serial No. 501,891; i.e., by means of a multi-stylus recorder wherein each stylus is energized by means of a filter tuned to one of the frequencies of the resonant selection circuits 20, 25, 21, 26, 23, 27, etc. of the present system.

In net result a very simple and effective telemetering system is provided, on a frequency coding basis, which requires no special code conversion or multiplexing equipment at receiver or transmitter. At the same time the system inherently generates time coded pulses, which may be employed to indicate shaft position, when read out on a time sequential basis.

While I have described and illustrated one specific embodiment of my invention, it will be clear that variations of the details of construction which are specifically illustrated and described may be resorted to without departing from the true spirit and scope of the invention as defined in the appended claims.

What I claim is:

1. In a system for reading out the angular position of a coded disc, said disc having plural codings at different radii, devices for illuminating said different codings in succession, comprising a luminescent condenser for each of said codings, means resonating with each of said condensers at a different frequency to form a differently tuned circuit, a source of oscillations adjustable to any of said different frequencies, means for adjusting the frequencies of said oscillations to said frequencies of said differently tuned circuits in succession, and means for coupling said oscillations to said tuned circuits simultaneously.

2. A system for directing illuminations along separate paths to a common destination in succession, comprising a plurality of electroluminescent condensers each located on one of said paths, a separate tuning coil in circuit with each of said condensers, each condenser and a tuning coil in series therewith forming a resonant circuit and tuned to a frequency substantially different from the remaining ones of said resonant circuits, an oscillator tunable over the frequencies of said resonant circuits whereby any of said resonant circuits may be energized by suitably tuning said oscillator, means for tuning said oscillator to the frequencies of said resonant circuits in succession, means coupling said oscillator with all said resonant circuits simultaneously, and a photo-electric pick-up located at said common destination.

3. The combination according to claim 2, wherein said system is arranged to effect illumination of said electroluminescent condensers one at a time in response to said oscillator.

4. In combination, a digitally coded disc secured to a shaft for presenting a different multiple digit code along a line in space for each different angular position of said shaft, means comprising a plurality of spaced electroluminescent condensers for generating areas of light radiation along said line, means for energizing said condensers in sequence whereby light is passed and blocked selectively by said disc according to the value of said code, said means for energizing comprising a source of oscillations of frequencies each peculiar to a different one of said condensers.

5. The combination according to claim 4, wherein said source of oscillations is a frequency modulated source of oscillations, a plurality of tuning elements each connected in energy coupling relation to a different one of said condensers, each tuning element and associated condenser pair being tuned to a different frequency included in the band encompassed by said oscillations.

6. A plurality of filters each tuned to respond to a different frequency within a predetermined band, a source of oscillations, means for modulating the frequency of said oscillations over said predetermined band, means coupling said oscillations with all said filters, a plurality of electrodes each coupled with a different one of said filters for energization by said oscillations, means responsive to energization by said electrodes for generating a point of light under the energized electrode, coded devices for selectively passing and blocking said points of light according to the value of said code, a photoelectric cell for detecting the passed points of light and generating corresponding output signals, means for transmitting said signals to a remote location, means at said remote location for receiving said signals, a plurality of devices at said remote location each arranged to respond to a different one of said signals, and means for visually presenting said code in response to said signals.

7. A plurality of electroluminescent condensers, means comprising a source of frequency modulated waves for energizing said electroluminescent condensers in sequence, a photoelectric cell and means for directing light from said electroluminescent condensers to said photoelectric cell selectively in accordance with a digital code, wherein said last means includes a binary coded disc, said condensers being arranged along a radius of said disc and in superposition of said code elements of said disc, said code elements being selectively opaque and translucent.

8. A plurality of electroluminescent condensers, means comprising a source of frequency modulated waves for energizing said electroluminescent condensers in sequence, a photoelectric cell and means for directing light from said electroluminescent condensers to said photoelectric cell selectively in accordance with a digital code, wherein said last means includes a binary coded disc, said condensers being arranged along a radius of said disc and in superposition of code elements of said disc, said code elements being selectively opaque and translucent, and wherein said first means comprises a circuit element operatively associated with each of said condensers to provide a filter, each of said filters being tuned to a different frequency in a frequency band, means coupling said source of frequency modulated oscillations to all said filters simultaneously, said frequency modulated waves having a total frequency deviation at least extending over said frequency band.

References Cited in the file of this patent

UNITED STATES PATENTS

| | | |
|---|---|---|
| 1,794,393 | Brown et al. | Mar. 3, 1931 |
| 2,383,321 | Kleber | Aug. 21, 1945 |
| 2,408,589 | Wells | Oct. 1, 1946 |
| 2,541,247 | Herr | Feb. 13, 1951 |
| 2,659,072 | Coales et al. | Nov. 10, 1953 |
| 2,694,785 | Williams | Nov. 16, 1954 |
| 2,698,915 | Piper | Jan. 4, 1955 |
| 2,728,815 | Kalfaian | Dec. 27, 1955 |
| 2,755,020 | Belcher | July 17, 1956 |
| 2,773,216 | Edmunds | Dec. 4, 1956 |
| 2,790,161 | Joormann | Apr. 23, 1957 |
| 2,793,807 | Yaeger | May 28, 1957 |
| 2,807,664 | Kleinberg et al. | Sept. 24, 1957 |
| 2,810,883 | Carnine | Oct. 22, 1957 |
| 2,813,229 | Sacks | Nov. 12, 1957 |
| 2,818,548 | Kazan | Dec. 31, 1957 |
| 2,836,766 | Halsted | May 27, 1958 |
| 2,851,634 | Kazan | Sept. 9, 1958 |
| 2,914,678 | Kazan | Nov. 24, 1959 |

FOREIGN PATENTS

| | | |
|---|---|---|
| 1,133,387 | France | Nov. 19, 1956 |

OTHER REFERENCES

Mellon Institute of Industrial Research Quarterly Report No. 3, Second Series of The Computer Components Fellowship No. 347, April 1954–June 30, 1954 (5 pages), pages 1, 2, 3, and 4 relied upon. Copy in Div. 37.